(12) United States Patent  
Wild

(10) Patent No.: US 10,731,864 B2  
(45) Date of Patent: Aug. 4, 2020

(54) COOKING APPLIANCE

(71) Applicant: Convotherm-Elektrogeräte GmbH, Eglfing (DE)

(72) Inventor: Hannes Wild, Riegsee (DE)

(73) Assignee: CONVOTHERM ELEKTROGERAETE GMBH, Eglfing (DE)

( * ) Notice: Subject to any disclaimer, the term of this patent is extended or adjusted under 35 U.S.C. 154(b) by 83 days.

(21) Appl. No.: 15/995,822

(22) Filed: Jun. 1, 2018

(65) Prior Publication Data

US 2018/0347821 A1 Dec. 6, 2018

(30) Foreign Application Priority Data

Jun. 2, 2017 (DE) .................. 10 2017 209 399

(51) Int. Cl.
*F24C 7/08* (2006.01)
*A47J 27/00* (2006.01)
*F24C 15/00* (2006.01)

(52) U.S. Cl.
CPC ............. *F24C 7/085* (2013.01); *A47J 27/002* (2013.01); *F24C 15/008* (2013.01)

(58) Field of Classification Search
CPC ........ F24C 3/126; F24C 7/085; F24C 15/008; A47J 27/002
See application file for complete search history.

(56) References Cited

U.S. PATENT DOCUMENTS

| | | | | |
|---|---|---|---|---|
| 2007/0246453 | A1* | 10/2007 | Nam | F24C 3/126 219/413 |
| 2017/0208652 | A1* | 7/2017 | Luckhardt | F24C 7/085 |
| 2017/0261213 | A1* | 9/2017 | Park | F24C 7/085 |
| 2018/0372326 | A1* | 12/2018 | Park | H04M 1/72533 |

FOREIGN PATENT DOCUMENTS

| | | | |
|---|---|---|---|
| DE | 102013114230 A1 | 6/2015 | |
| WO | WO-2018236039 A1 * | 12/2018 | .............. F24C 3/12 |

* cited by examiner

*Primary Examiner* — Brenda C Bernardi
(74) *Attorney, Agent, or Firm* — Ohlandt, Greeley, Ruggiero & Perle, LLP

(57) ABSTRACT

A cooking appliance, in particular a commercial cooking appliance, with a housing, in which a cooking chamber is arranged, which has a cooking chamber opening, which can be opened and closed using a cooking chamber door; with an optical system, which has at least one optical capturing device above the cooking chamber opening; and with a protection against contamination for the optical system, wherein the protection against contamination has a catching surface, which can be moved using a drive unit and which, seen in the capturing direction of the optical system, is arranged in front thereof.

13 Claims, 6 Drawing Sheets

COOKING APPLIANCE

BACKGROUND

1. Field of the Disclosure

The disclosure relates to a cooking appliance, in particular a commercial cooking appliance.

2. Discussion of the Background Art

Such a cooking appliance is known from DE 10 2013 114 230 A1. This cooking appliance is provided with an optical system, which, for example, may be designed as a camera, and which, via an interposed lens, which both are arranged above a cooking chamber opening, may observe the area in front of the cooking chamber.

In order to protect the lens from contaminations, which, in particular, may be caused by the exiting cooking chamber atmosphere upon opening the cooking chamber door, the known cooking appliance is provided with a compressed gas source and an opening, which is associated with the beam path of the optical system, and from which gas, provided by the compressed gas source, pressurised compared to the environment, may exit.

The compressed gas source may, for example, be a fan arranged in the housing, or the compressed gas source may be a port to a compressed gas system or a gas cylinder, which results in a relatively high expenditure with respect to the devices for the generic cooking appliance. Moreover, since such compressed gas sources are known, a further embodiment of the known cooking appliance provides that the opening associated with the beam path of the optical system is arranged in the area of the cooking chamber door, so that the opening and the optical system arranged in the opening are covered, when the cooking chamber door is closed. This arrangement of the opening, however, does not provide a contribution to the solution of the technical problem mentioned in the publication stated, since this arises in the first place, when the cooking chamber door is opened and since, upon opening the cooking chamber door, the optical system is exposed again, since, as stated above, it can only be covered with the cooking chamber door closed.

Therefore, it is an object of the present disclosure to create a cooking appliance which, in a technically simple and reliable manner, enables protecting of an optical system from contaminations, in particular by the cooking chamber atmosphere.

SUMMARY

Specifically, according to the disclosure, a cooking appliance is created, which, in particular, may be designed as a commercial cooking appliance.

The cooking appliance has a housing, in which a cooking chamber to receive food to be cooked is arranged. The cooking chamber has a cooking chamber opening, which can be opened and closed using a cooking chamber door, wherein there also are cooking appliances, which do not require a cooking chamber door.

Furthermore, the cooking appliance according to the disclosure is provided with an optical system, which may have at least one optical capturing device, which, for example, may be designed as a camera. The optical capturing device is arranged in the area of, in particular above, the cooking chamber opening, so that with this capturing device, the area in front of the cooking chamber opening may be captured, in order to determine, for example, whether, and if so, food to be cooked is inserted into the cooking chamber or taken out of the cooking chamber after the cooking process. Using such a capturing device, it is possible to capture the type of food to be cooked or also other objects, as for example food trays, in order to be able to select, by capturing the type of food to be cooked, for example, suitable cooking processes or in order to be able to determine, after performing a cooking process, the quality of the cooked food.

Since upon opening the cooking chamber door, cooking chamber atmosphere, in particular in the form of steam/swaths, may escape from the cooking chamber, the optical system is subject to a constant risk of contamination, for which the cooking appliance according to the disclosure has a protection against contamination or a protective device against contamination, resp., which may prevent the optical system, and in particular its capturing device and the optical lens arranged in front thereof, if applicable, from being contaminated by the cooking chamber atmosphere.

For this purpose, the protective device against contamination of the cooking appliance according to the disclosure has at least one catching surface, which, using a drive unit, is movably guided and which, seen in the capturing direction of the optical system, is arranged in front thereof, so that steam or swaths escaping from the cooking chamber do not impinge on the optical system, but on the catching surface, thus preventing contamination of the optical system in a secure and simple manner.

By the movability of the catching surface it is made possible to discharge the contamination particles collected on the catching surface away from the catching surface. In order to prevent the optical system, and in particular its capturing device, from being hindered in its capturing capability by the catching surface, the catching surface is designed optically transparent, and thus may, for example, consist of glass or transparent plastic.

The contents of the subordinate claims are advantageous further developments of the disclosure.

A particularly preferred embodiment has a, in particular circular, rotary disk, on which the catching surface is designed.

This rotary disk may be rotated using a suitable drive unit, so that particles impinging on the catching surface may be moved away from the catching surface by centrifugal force.

In order to further improve the effect of the rotation, it is possible to attach at least one blade unit, normally, however, a plurality of blade units, on the catching surface, which, in addition to applying a centrifugal force to the contamination particles, enable creating an airflow directed radially outward, which further improves the discharge of the contamination particles collected on the catching surface.

Furthermore, in a further particularly preferred embodiment, it is possible to provide the catching surface with at least one wiper, or a plurality of wipers, if applicable, which, similar to a windscreen wiper for a vehicle windscreen, remove the particles collected on the catching surface.

In an alternative embodiment, it is possible to design the catching surface in an arched fashion. In this case, in a further particularly preferred embodiment, it can be part of a rotary cylinder, which is either rotated or also swivelled back and forth using the drive unit, in order to remove the particles collected on the catching surface by the resulting movement.

In this embodiment, too, with a further particularly preferred development, it is possible to combine the catching surface with one or a plurality of wipers, which further improve the discharge of the contamination particles collected.

Finally, with the arched embodiment, it is possible to attach the catching surface on a lens unit, which, for example, may be in operative connection with the capturing device, in particular the camera, via a light-guide body. In this embodiment, it is expedient to apply a swivel movement to the lens unit, and thus to the catching surface, and, in order to further improve removal of the contamination particles, to also combine this embodiment with one or a plurality of wipers, which further improve the removal of contamination particles collected on the catching surface within the course of its swivel movement.

Further details, features and advantages of the disclosure result from the following description of embodiments on the basis of the drawings.

DETAILED DESCRIPTION OF THE PREFERRED EMBODIMENT

Before discussing the principles of the present disclosure in detail, it shall be emphasised that, within this application, the term "cooking appliance" shall mean commercial cooking appliances as well as household cooking appliances and on the whole, generally speaking, food treatment appliances, which may perform cold as well as hot treatment of food and, for example, may comprise hot-air steamers, combi steamers, beverage dispensers, beverage mixers, microwave ovens, and other food treatment appliances.

Figure 1:
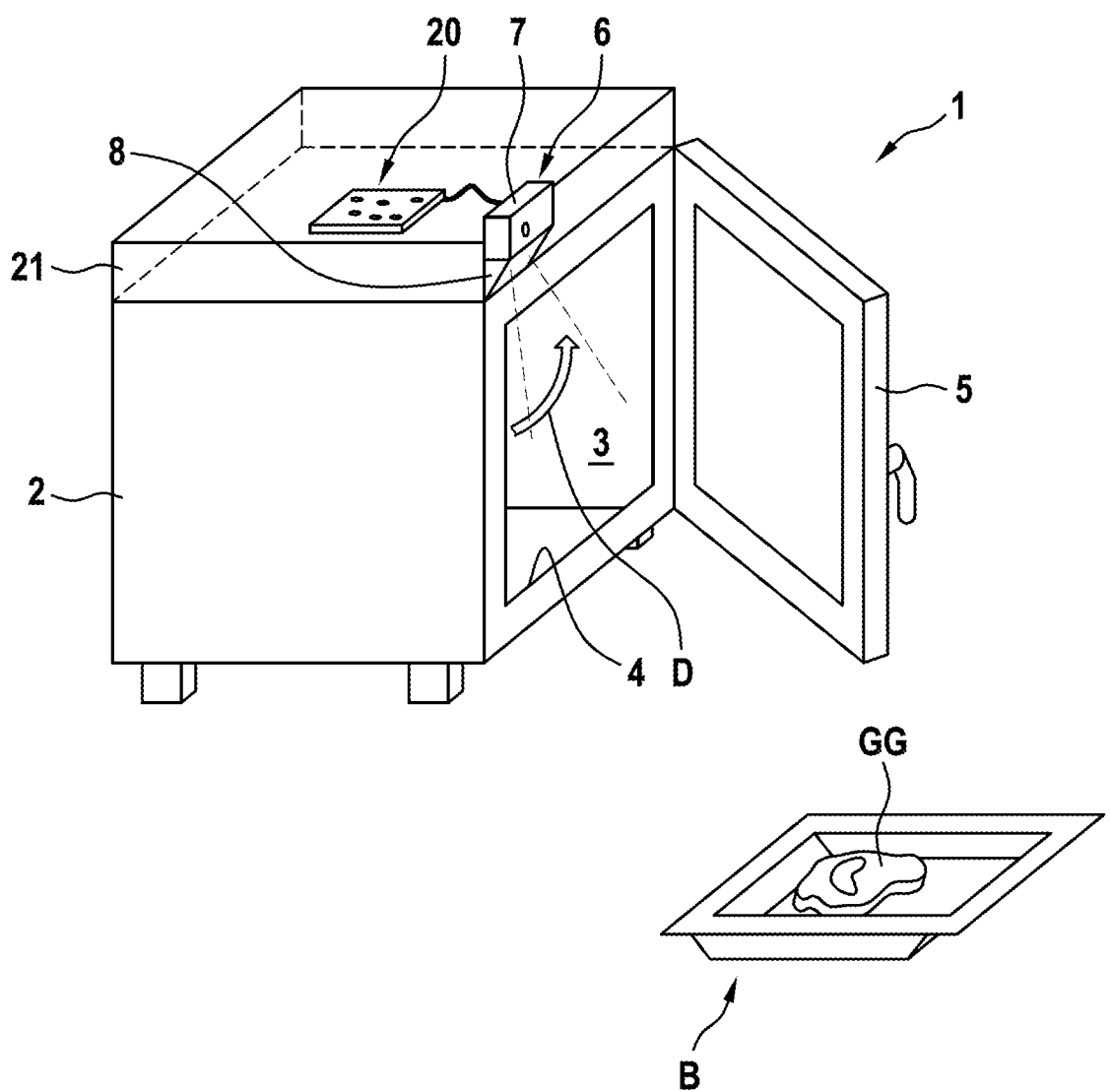
FIG. 1 is a schematically greatly simplified perspective representation of a cooking appliance according to the disclosure.

FIG. 1 shows a schematically greatly simplified representation of a cooking appliance 1 according to the disclosure, which has a housing 2. In the housing 2, a cooking chamber 3 is arranged, which has a cooking chamber opening 4. The cooking chamber opening 4 may be opened and closed using a cooking chamber door 5, in order to insert, for example, food to be cooked GG arranged on a food tray B into the cooking chamber 3, or to take it out of the cooking chamber 3 after the cooking process.

FIG. 1 shows schematically greatly simplified an optical system 6, which may comprise an optical capturing device, in particular in the form of a camera, and a lens arranged in front of the camera, if applicable, which hereinafter will be explained on the basis of the various embodiments of the disclosure.

For the sake of completeness, it shall be pointed out that the cooking appliance 1 may further have a control/and analysis unit 20, which preferably, like the optical system 6, may be arranged in a housing attachment 21 on the cooking appliance 1.

FIG. 1 further illustrates that from the cooking chamber 3, with the cooking chamber door 5 open, swaths or steam may exit, which in FIG. 1 are symbolised by the arrow D. This steam or these swaths may contaminate the optical system 6, wherefore this, according to the disclosure, is provided with a protection against contamination or a protective device against contamination 8, resp., which in FIG. 1 is only symbolised schematically by a triangle 8 arranged under the optical system 6 and hereinafter will be explained in detail on the basis of the embodiments according to FIGS. 2 to 9.

Figure 2:
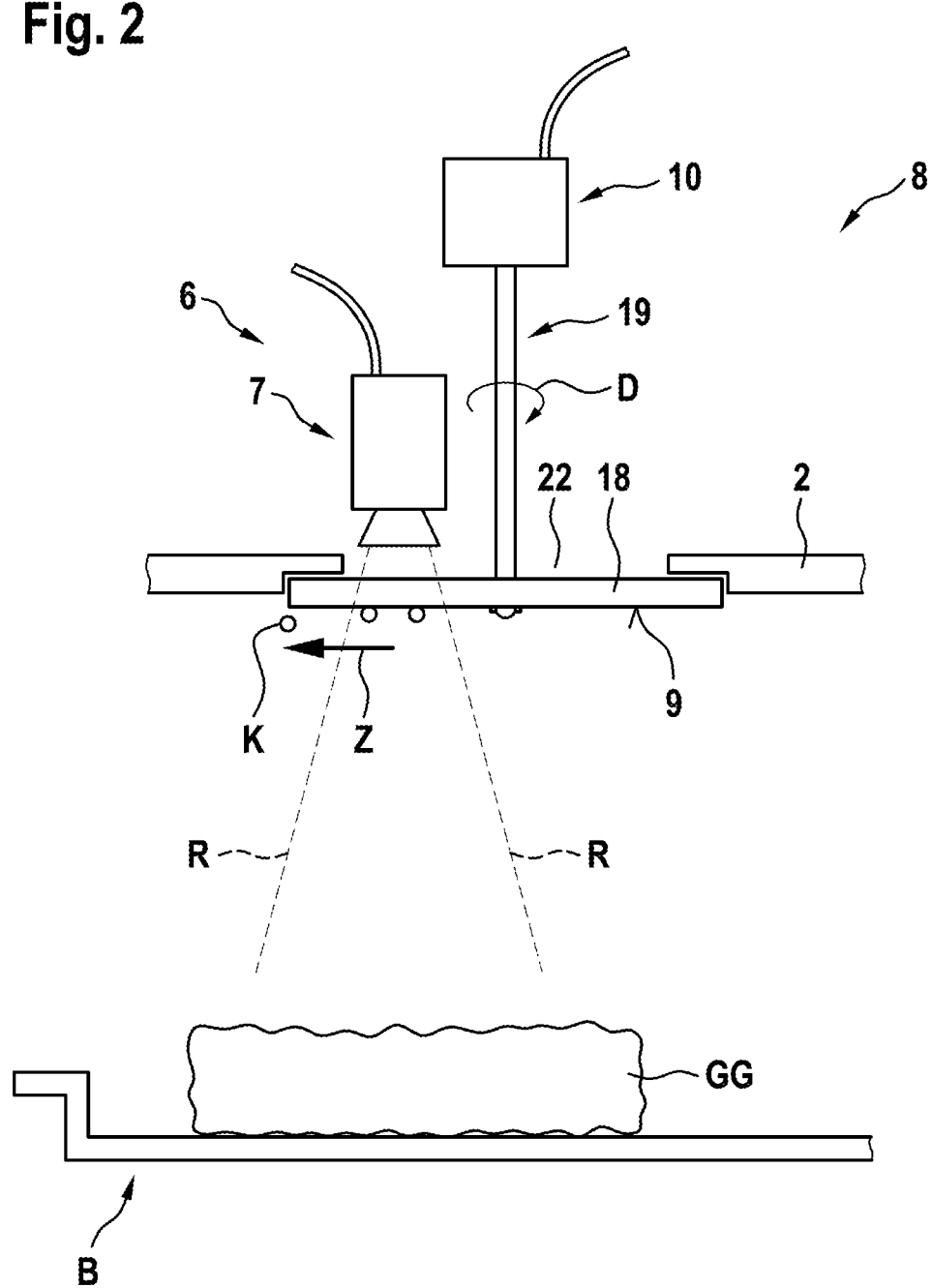
FIG. 2 is a schematically greatly simplified schematic diagram of a first embodiment of a protection against contamination of the cooking appliance according to the disclosure.

FIG. 2 shows a first embodiment variant of the protection against contamination 8, which in this case comprises a rotary disk 18, on which a catching surface 9 is arranged. As illustrated in FIG. 2, the catching surface 9 is that surface of the rotary disk 18, which is directed towards the food to be cooked GG, from which, beside the swaths D exiting from the cooking chamber 3, steam may likewise ascend after the cooking process, which may contaminate the capturing device 7 of the optical system 6. Therefore, according to the representation chosen in FIG. 2, the rotary disk 18 with its catching surface 9 is arranged underneath the capturing device 7, thereby covering it, and has an optically transparent design, so that the capturing device 7, despite the rotary disk 18 being arranged in front thereof, may in this case capture the food to be cooked GG, which is symbolised by the dashed lines R, which represent the capturing direction of the capturing device 7.

By the rotation D of the rotary disk 18, which for this purpose is operatively connected with a drive unit 10, for example in the form of an electric motor, via a drive shaft 19, the contamination particles, in FIG. 2 symbolised by the small circles K, are removed from the catching surface 9 by a centrifugal effect, wherein this centrifugal effect is symbolised by the arrow Z, which also illustrates the radially outward direction of movement of the particles K.

As schematically illustrated in FIG. 2, the drive unit 10 and the shaft 19 are arranged in the housing 2, which has a housing opening 22, through which the capturing device 7 may capture objects and in which, in the exemplary case of the Fig. shown, the rotary disk 18 is arranged.

Figure 3:
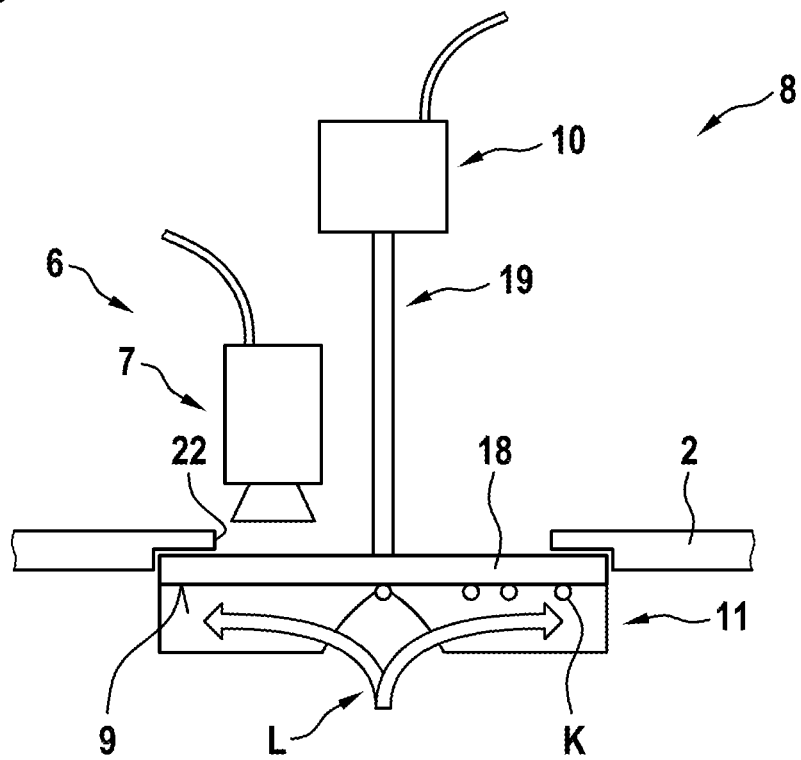
FIG. 3 is a representation of a further embodiment corresponding to FIG. 2.
Figure 4:
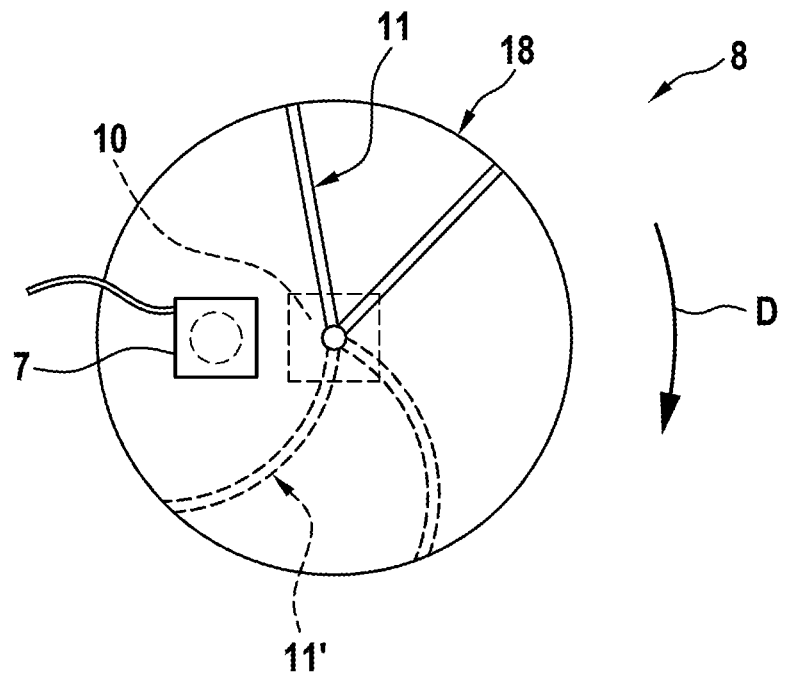
FIG. 4 is a top view of the embodiment according to FIG. 3.

FIGS. 3 and 4 show an alternative embodiment, which substantially corresponds to that of FIG. 2, so that with regard to all corresponding features, reference can be made to FIG. 2. As an additional feature, the embodiment according to FIGS. 3 and 4 has the arrangement of at least one blade unit 11, in this case, however, a plurality of such blade units 11, 11'. These may, as illustrated in FIG. 4, either run radially outward and be entirely straight or also be arched, which is symbolised by the blade units 11'.

Hereby, the airflow L, symbolised by the double arrow in FIG. 3, is generated, which, beside the centrifugal effect, supports the discharge of the contamination particles K from the catching surface 9.

Figure 5:
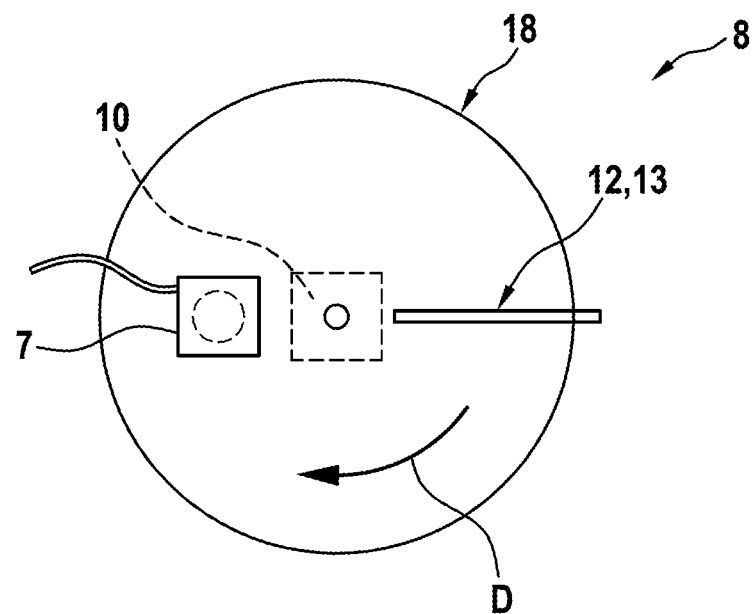
FIG. 5 is a top view of a further embodiment of the protection against contamination according to the disclosure.
Figure 6:
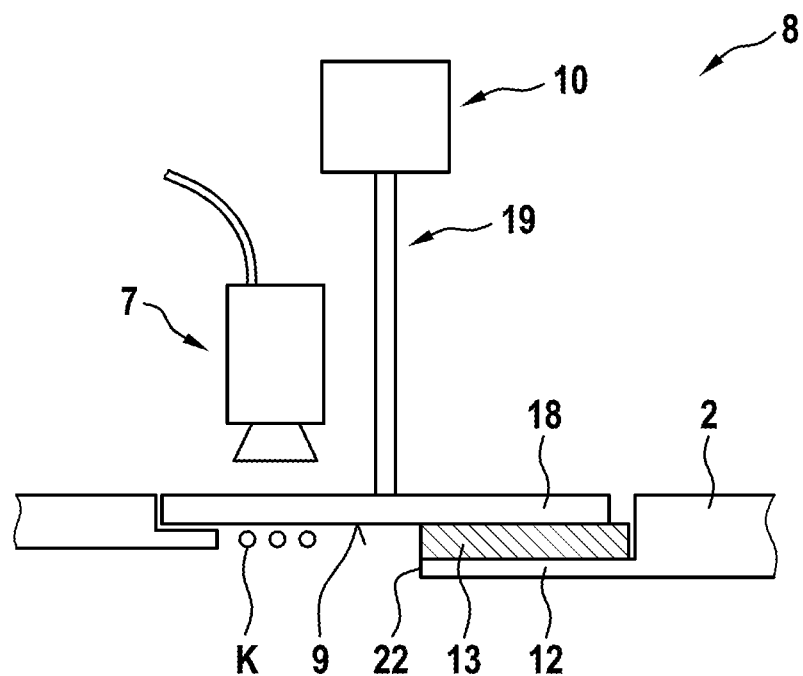
FIG. 6 is a representation of the protection against contamination according to FIG. 5 corresponding to FIG. 2.

FIGS. 5 and 6 show a further embodiment of the protection against contamination 8, which again substantially corresponds to the embodiment according to FIG. 2, i.e., has a rotary disk 18, which via the drive shaft 19 is connected with the drive unit 10 and is moved in a rotation D. In this embodiment, the catching surface 9 of the rotary disk 18 is combined with a wiper unit 13, which is arranged in a holding portion 12 of the housing 2, which in particular results from the representation of FIG. 6. This wiper unit or this wiper 13, resp., rests on the catching surface 9 and may remove particles K from the catching surface 9 in connection with the centrifugal effect.

Figure 7:
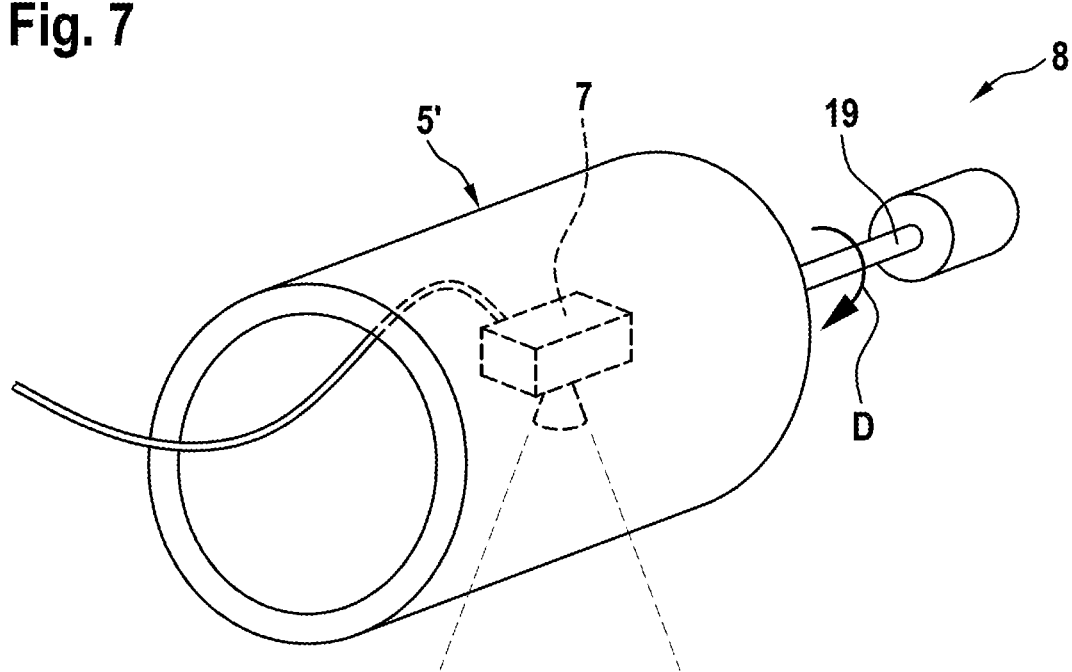
FIG. 7 is a further greatly simplified perspective schematic diagram of a further embodiment of the protection against contamination according to the disclosure.
Figure 8:
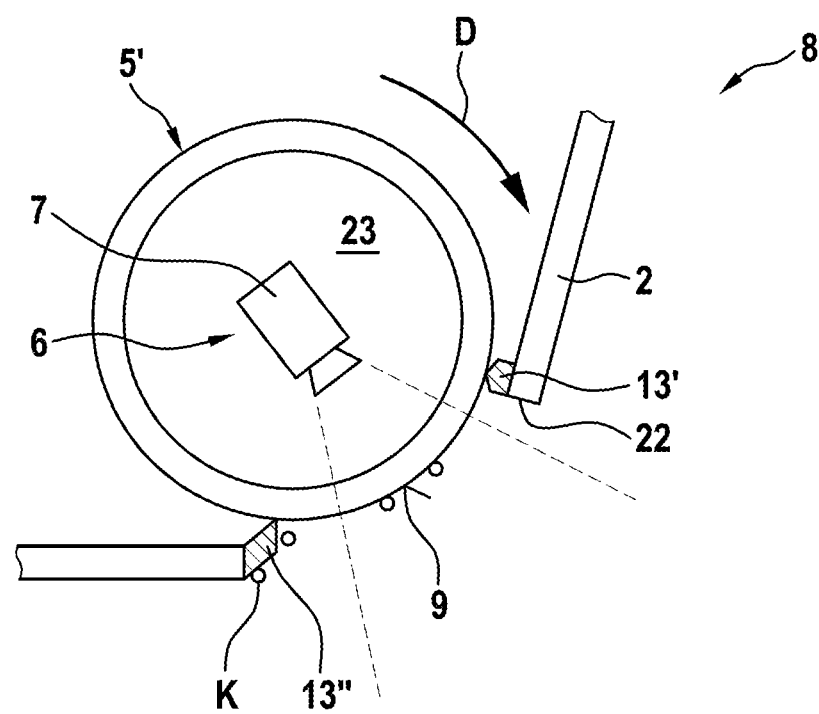
FIG. 8 is a front view of the arrangement according to FIG. 7.

FIGS. 7 and 8 show a further embodiment variant of the protection against contamination 8. In this case, the catching surface 9', as illustrated in FIG. 8, has an arched design and represents that part of a rotary cylinder 5', which, again via the drive shaft 19, is in operative connection with the drive unit 10 and can be moved in rotation D.

In this embodiment, the capturing device 7 of the optical system 6 is arranged in the interior 23 of the rotary cylinder 5' and is combined with the wipers 13', 13", which are arranged in a portion of the housing 2 adjacent to the rotary cylinder 5' and rest on the catching surface 9' and thereby may separate the contamination particles K from the catching surface 9', which in FIG. 8 is symbolised by the small circles K and the wiper 13".

Figure 9:
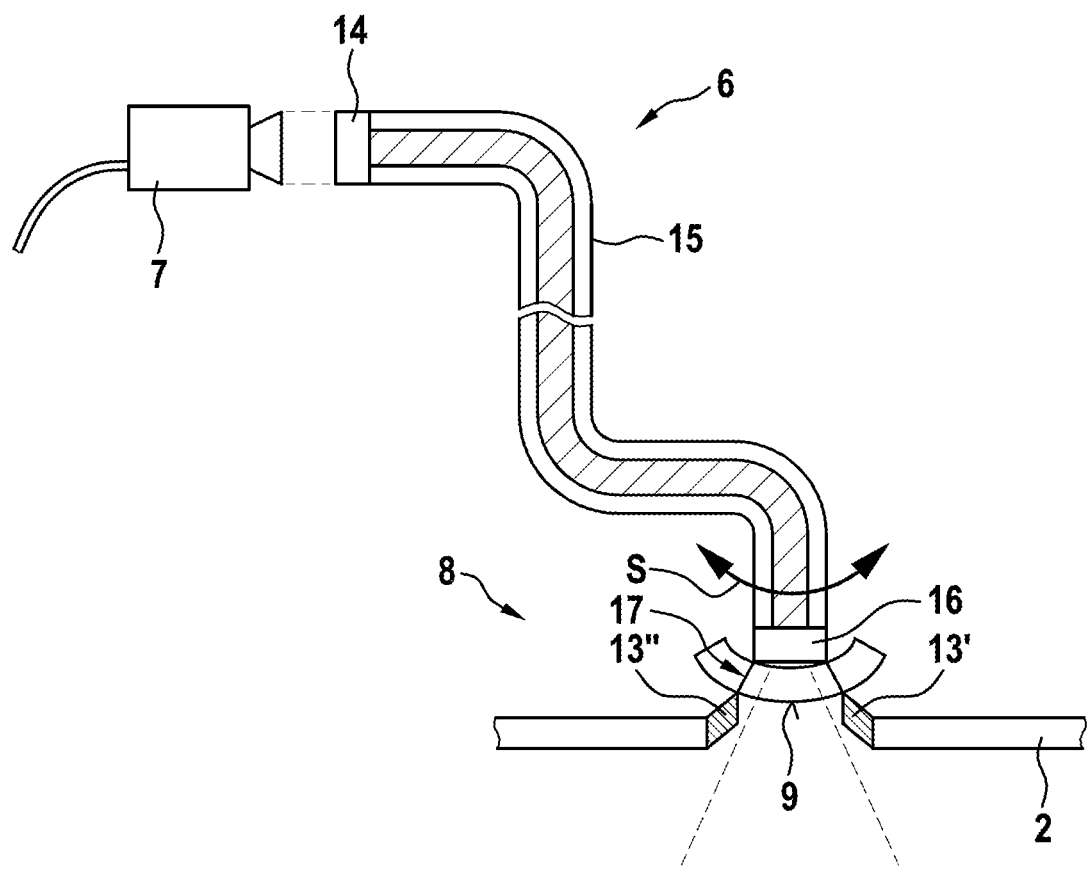
FIG. 9 is a further schematic diagram of a further alternative embodiment of the protective device against contamination according to the disclosure.

FIG. 9 shows a further embodiment variant of the protection against contamination 8 according to the disclosure, which again has an arched catching surface 9', which in this case is part of a lens unit 17. Via a light-guide body 15, for example in the form of a fibre optic cable, this lens unit 17 cooperates with the camera 7 and for that has coupling-out optics 14 and coupling-in optics 16, which is connected to the lens unit 17. In this embodiment, too, a wiper arrangement 13', 13" is provided, which enables the removal of contamination particles from the catching surface 9'. For that, the lens unit 17 is moved in a swivel movement via a suitable drive unit, which in FIG. 9 is symbolised by the double arrow S. Thus, a movement swivelling back and forth S is generated, so that the catching surface 9' may swipe across the wipers 13', 13", which may enable the removal of contamination particles.

Beside the above written disclosure of the disclosure, hereby, supplementing the disclosure, explicit reference shall be made to the graphic representation of the disclosure in FIGS. 1 to 9.

LIST OF REFERENCE SIGNS

1 Cooking appliance
2 Housing
3 Cooking chamber
4 Cooking chamber opening
5 Cooking chamber door
6 Optical system
7 Optical capturing device, in particular camera
8 Protection against contamination/protective device against contamination
9, 9' Catching surface
10 Drive unit
11, 11' Blade unit/blades
12 Wiper holder
13, 13', 13" Wiper/wiper units
14 Coupling-out optics
15 Optical fibre/fibre optic cable
16 Coupling-in optics
17 Lens unit
18 Rotary disk
19 Drive shaft
20 Control/and analysis unit
21 Housing attachment
22 Housing opening
23 Interior of the rotary cylinder 5'
D Swaths/steam
B Food tray
GG Food to be cooked
D Direction of rotation/rotation
R Capturing direction of the camera 7
Z Centrifugal force/discharge direction
K Contamination particles
S Swivel movement

What is claimed is:

1. A cooking appliance comprising:
 a housing, in which a cooking chamber is arranged, having a cooking chamber opening;
 an optical system, having at least one optical capturing device in the area of the cooking chamber opening; and
 a protection against contamination for the optical system, wherein the protection against contamination is transparent and has a catching surface, which is movable using a drive unit and which, seen in the capturing direction of the optical system, is arranged and remains in front of the optical system while the optical system is in operation.

2. The cooking appliance according to claim 1, wherein the catching surface is part of a plane.

3. The cooking appliance according to claim 1, wherein the catching surface is rotatable using the drive unit.

4. The cooking appliance according to claim 1, wherein the catching surface is provided with at least one blade unit.

5. The cooking appliance according to claim 1, wherein the protection against contamination further has at least one wiper, which rests on the catching surface.

6. The cooking appliance according to claim 1, wherein the catching surface is arched.

7. The cooking appliance according to claim 6, wherein the arched catching surface is part of a rotary cylinder, in which the optical system is arranged with at least its optical capturing device.

8. The cooking appliance according to claim 6, wherein at least one wiper rests on the arched catching surface.

9. The cooking appliance according to claim 6, wherein the arched catching surface can be moved in a swivel movement using the drive unit.

10. The cooking appliance according to claim 9, wherein the catching surface is part of a lens unit.

11. The cooking appliance according to claim 1, wherein the cooking chamber opening can be opened and closed using a cooking chamber door.

12. The cooking appliance according to claim 1, wherein the optical system is arranged above the cooking chamber opening.

13. The cooking appliance according to claim 2, wherein the catching surface is a circular, rotary disk.

* * * * *